United States Patent [19]

Drake et al.

[11] Patent Number: 5,021,157

[45] Date of Patent: Jun. 4, 1991

[54] FILTRATION, DRAINAGE, AND DRYING APPARATUS FOR DELIQUIFICATION OF SLUDGES

[76] Inventors: Kenneth M. Drake, 16734 Manowar La., Friendswood, Tex. 77546; John W. Anderson, 403 Hidden Harbor, Houston, Tex. 77079; Lee D. Carr, 18610 Martinique, Houston, Tex. 77058; Fred I. Peyton, Box 1791, Kingsland, TX

[21] Appl. No.: 478,614

[22] Filed: Feb. 12, 1990

Related U.S. Application Data

[63] Continuation-in-part of Ser. No. 347,162, May 3, 1989, abandoned.

[51] Int. Cl.$^5$ .............................................. B01D 24/12
[52] U.S. Cl. ........................................ 210/248; 14/1; 106/122; 210/293; 210/510.1
[58] Field of Search ............... 106/122, 153; 210/290, 210/291, 293, 506, 510.1, 609, 248, 507; 14/51, 53, 70, 71.1, 71.3, 1; 264/129; 501/124; 49/274; 560/157

[56] References Cited

U.S. PATENT DOCUMENTS

| | | | |
|---|---|---|---|
| 2,021,122 | 11/1935 | Fowler | 210/198 |
| 2,644,790 | 7/1953 | Harper et al. | 210/290 |
| 3,852,224 | 12/1974 | Bridgeford | 106/122 |
| 3,922,413 | 11/1975 | Reineman | 264/129 |
| 4,289,627 | 9/1981 | Oisselbeck et al. | 210/507 |
| 4,366,255 | 12/1982 | Lankard | 501/124 |
| 4,431,549 | 2/1984 | Highstreet et al. | 210/791 |
| 4,448,690 | 5/1984 | Maphis | 210/609 |
| 4,481,114 | 11/1984 | Riise | 210/290 |
| 4,521,992 | 6/1985 | Campbell | 49/274 |
| 4,537,687 | 8/1985 | Piper | 210/793 |
| 4,564,450 | 1/1986 | Piper et al. | 210/293 |
| 4,576,718 | 3/1986 | Reischl et al. | 210/616 |
| 4,640,643 | 2/1987 | Williams | 404/4 |

FOREIGN PATENT DOCUMENTS

| | | | |
|---|---|---|---|
| 2354917 | 5/1975 | Fed. Rep. of Germany | 210/500.1 |
| 2616664 | 10/1977 | Fed. Rep. of Germany | 210/609 |
| 50-38864 | 4/1975 | Japan | 210/483 |
| 58-24399 | 2/1983 | Japan | 210/609 |

OTHER PUBLICATIONS

Grant and Hackh's Chemical Dictionary, Fifth Edition, p. 216.
"Natural Method of Sludge Dewatering", Water Pollution Control Federation, Washington, D.C., Chapter 3.

*Primary Examiner*—Robert A. Dawson
*Assistant Examiner*—Joseph Drodge
*Attorney, Agent, or Firm*—Vaden, Eickenroht, Thompson & Boulware

[57] ABSTRACT

An improved continuous, smooth, porous, rigid surface is supported by an array of shaped, porous, support blocks mounted on an impervious planar foundation and surrounded by bi-functional containment walls to form a gravity filtration and drainage apparatus. The particular shape of the support blocks in contact with the foundation creates a plurality of parallel flumes, the center-lines of which align with the slope, if any, of the plane to facilitate drainage to contiguous drainage ditches. Accessibility of these drainage flumes at both ends of the overall structure provide for inspection, flushing, and purging of the overlying filter surface to assure functionality by simplified maintenance procedures. The drainage apparatus can be attached to an impervious evaporation surface, on which residual solids harvested from the surface of the drainage apparatus are deposited and periodically manipulated for further accelerated dewatering by evaporation.

9 Claims, 2 Drawing Sheets

FILTRATION, DRAINAGE, AND DRYING APPARATUS FOR DELIQUIFICATION OF SLUDGES

This application is a continuation-in-part of application Ser. No. 07/347,162, filed May 3, 1989 and now abandoned.

BACKGROUND OF THE INVENTION

1. Field of the Invention

This invention reveals an improved apparatus for natural dewatering of conditioned sludges in such a way as to decrease the time required for deliquification.

2. Description of the Prior Art

Natural drainage is the oldest method of reducing the water content of slurries and sludges. An excellent summary treatment of this subject is included in the Manual of Practice, No. 20 prepared by the Task Force on Sludge Dewatering, chaired by Charles T. Way, of the Water Pollution Control Federation in 1983 and is suggested as a reference for background.

Methods employed in the prior art include, among others, the use of open or covered lagoons for containment and evaporation, and sand drainage and drying beds, all of which are examples of the traditional and most simple methods. Properly operated, these methods are recognized as being capable of eventually yielding dryer residual solids than can any of the mechanical devices currently used for this purpose. However, problems inherent in the use of these methods, such as long residence time, large land area requirements, high periodic hand labor requirements, odor and insect control, and the like, have been resolved to various degrees of success by various mechanical, hydraulic and vacuum means, synthetic media, and other modifications and/or adaptations of the fundamental sand drainage technique. More recently, varied gradations of filtration media have been rigidified using synthetic resins for the purpose of providing fixed drainage surfaces that will support the weight of residual solids removal equipment without harming the underdrain water removal systems.

These devices have in themselves introduced new and significant problems in maintenance, operational continuity and reliability, and it is to this somewhat critical situation that the inventors herein have addressed their effort to develop a relatively low cost apparatus that is characterized by simplicity and reliability. Maintenance of the filtration and drainage surface is the key to operational reliability and objects of this invention provide the means to this end.

Returning to the prior art, the simplest method of consolidating sludge solids is to apply the slurry to a sand bed where the solids can be retained on the surface and the water filters away. The principle of supporting the surface filter sand with progressively coarser layers of gravel, from top to bottom, has been in practice of over 100 years. However, a sand bed is not desirable with the use of modern methods of moving residual sludge solids. That is, the spark of creativity since about 1950 has been the pursuit of methods that allow the use of the front-end loader or the like to remove the retained sludge solids without damaging the surface.

One method being marketed today is known as "vacuum assisted drying beds", which are implementations of Highstreet et al. (U.S. Pat. No. 4,431,549, issued Feb. 14, 1984); Riise (U.S. Pat. No. 4,481,114, issued Nov. 6, 1984); Stannard et al. (U.S. Pat. No. 4,340,478 issued July 20, 1982); Piper (U.S. Pat. No. 4,537,687, issued Aug. 27, 1985); and Piper et al. (U.S. Pat. No. 4,564,450, issued Jan. 14, 1986). An installation of such beds encountered, after an initial period of successful performance, plugging or blinding problems with the filtration drainage surfaces of the beds. After labor-intensive scrubbing, washing, backwashing and chemical cleaning and flushing, the beds were put back in service, only to experience the same problems after a short period of use. Subsequent intensive cleaning maintenance has resulted in diminished periods of satisfactory use, which are believed to be the result of the causes discussed below.

First, these beds are not functionally maintainable because the interstitial spaces between the media particles become fouled and washing them free of sludge matter either from the surface or by backwashing has proven only marginally successful. Normal backwashing opens a few paths through the media, but leaves the remained plugged, thereby allowing these few paths to be replugged when the media is put back in service.

Second, all of the patents referred to above specify the use of epoxy resin to rigidify the filtration matrix. Probably the earliest patent pertaining to a rigidifying drainage surface is U.K. Patent No. 1,403,186, Percharde, published Aug. 20, 1975, which specifies concrete as a binder, although epoxy is also mentioned. It is clear, however, that the matrix binder of choice in the prior art is epoxy resin, as evidenced by the above group of U.S. patents, which are all later than the British patent, indicating a turn away from any other binder.

Epoxy resin, however, when used as the matrix binder, will lead to the need for surface reapplications usually within the course of a year because of the destructive effects of ultraviolet exposure from sunlight. Regardless of how carefully surface reapplications are accomplished, progressive blinding of the interstitial surface spaces follows to ultimately defeat the original porous purpose intended.

Therefore, a feature of the present invention is to provide deliquification filtering apparatus for sludge that will not permanently foul or by simple means respond to cleaning to restore full surface function.

Another feature of the present invention is to provide deliquification filtering apparatus for sludge that includes a matrix media, the matrix binding material being a type that will not deteriorate as a result of exposure to ultraviolet radiation.

SUMMARY OF THE INVENTION

The apparatus disclosed herein efficiently provides drainage of liquids from sludges so as to permit the sludges to be deliquified in a rapid manner. The structure includes at least two layers supported on a rigid, planar, impervious, base slab. The top layer is a rigid, thin and porous structure formed of small, hard, uniform particles of materials bonded together by a urethane monomeric resin not subject to deterioration by ultraviolet radiation or natural sunlight. The lower layer is rigid and porous and includes particles preferably larger than those included in the top layer. The bonding material for this layer is also monomeric urethane resin. The lower layer is comprised of an array of uniformly shaped support blocks laid side by side and end to end, the underneath side of the lower layer including a plurality of open, parallel flumes. The lower layer extends beyond the outer perimeter of two opposing walls. Containment is provided by vertical side walls. The exposed flumes, outside the containment walls serve two purposes: to provide a pathway for draining water and to provide accessibility for intensified surface maintenance procedures. The underlying slab supporting the rigid, porous layers and the containment walls may be either level or sloped to facilitate drainage to a collection system. The containment walls include at least one removable gate to provide access and egress for solids removal equipment.

A nearby evaporation slab, preferably adjacent to the drainage structure, and preferably an extension of the underlying foundation slab, is provided as a receiving area for the drained solids removed from the drainage surface for further dewatering by evaporation. The evaporation rate is accelerated by frequent manipulation of the accumulated solids on the evaporation slab.

BRIEF DESCRIPTION OF THE DRAWINGS

So that the features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a preferred embodiment of the invention and are, therefore, not to be considered limiting of its scope for the invention may admit to other equally effective embodiments.

IN THE DRAWINGS

Figure 1:
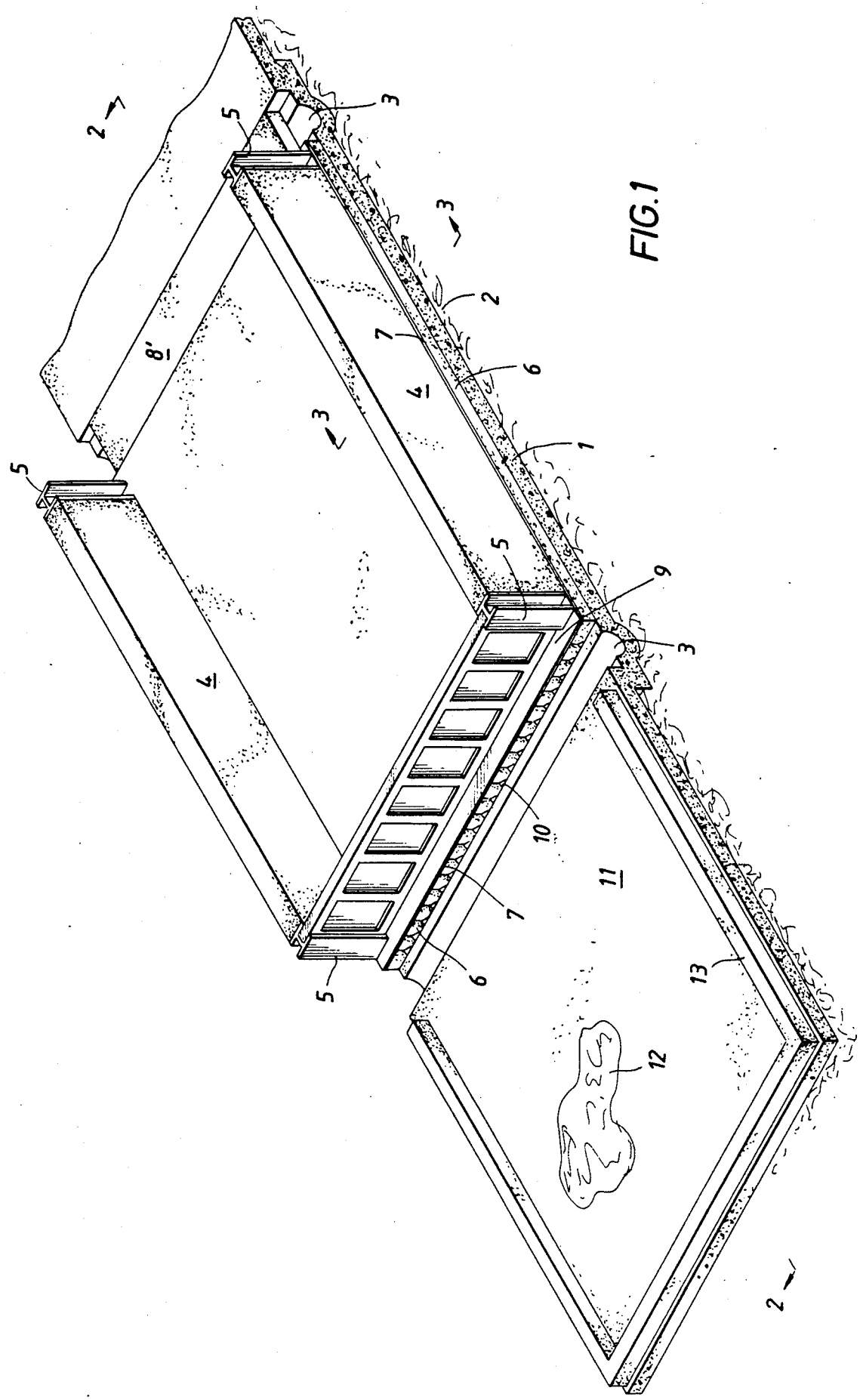

FIG. 1 is an isometric view of a preferred embodiment of the filtration, drainage and drying apparatus in accordance with the present invention.

Figure 2:
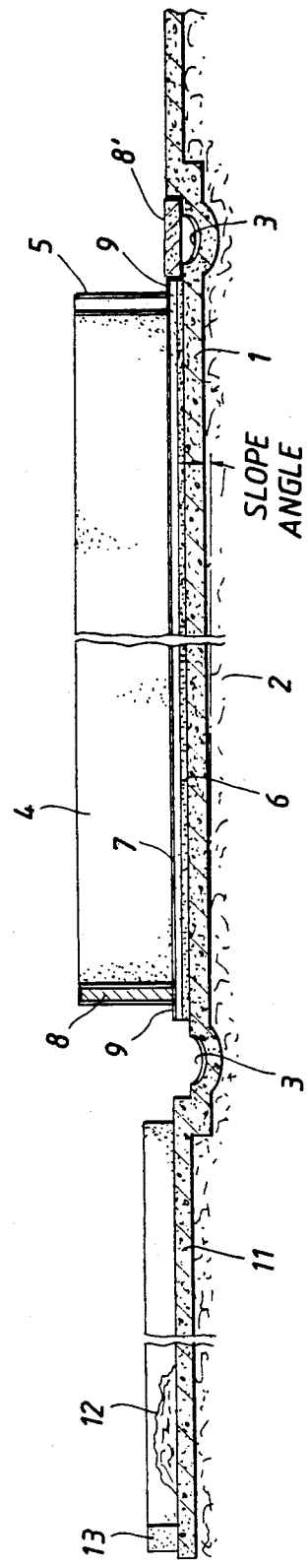

FIG. 2 is a cross section side view of the drainage and drying structures showing the slope orientation of the drainage structure and the underlayment of the filtration/drainage surface and support layers on the planar slab.

Figure 3:
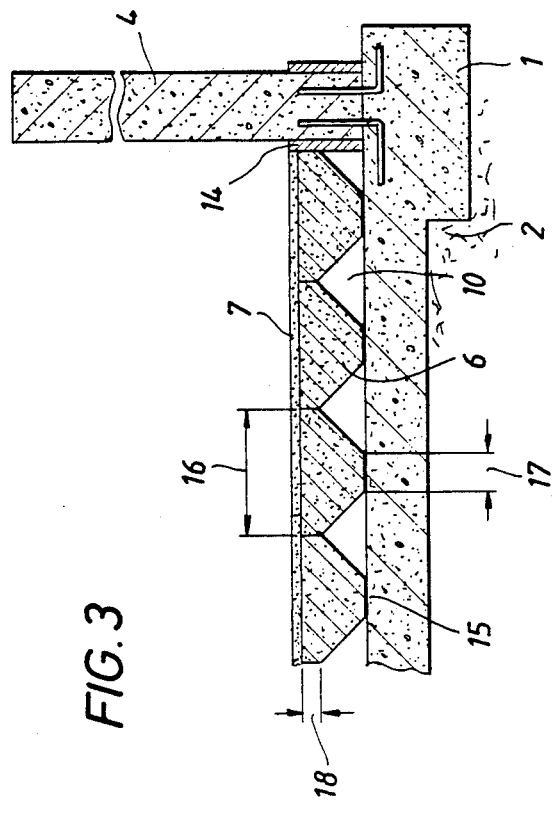

FIG. 3 is a sectional view of the drainage structure showing the attachment of the support blocks to the foundation slab with an elastomeric adhesive and a typical elastomeric expansion joint next to a containment wall. Also shown is the overlayment of the monolithic layer of rigid filter surface media.

Figure 4:
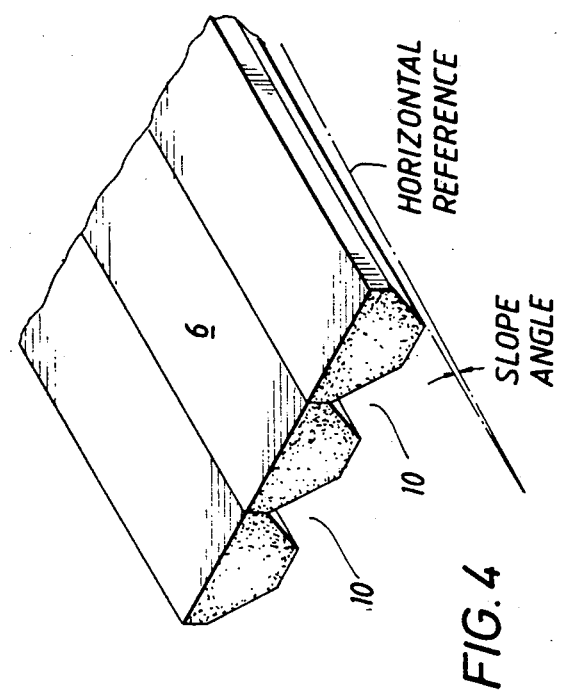

FIG. 4 is an isometric view of a typical support block and typical installation pattern creating the dual purpose flumes.

DESCRIPTION OF THE PREFERRED EMBODIMENT

The invention pertains to a drainage apparatus that forms the basis for an improved process for deliquifying conditioned sludge as a means of meeting the several operational and problem-solving objectives described and implied in the above background presentation. Coupled in series with an adjacent, hard, impervious evaporation surface, whereon the residual free-water-drained solids harvested from the drainage surface are deposited, the drainage apparatus can deliquify chemically conditioned sludges to solids levels on the order of 15% within a 6–8 hour retention period. Deliquification continues on the drying surface, with appropriate manipulation of the sludge piles known as re-windrowing, by evaporative drying to any desired degree. Properly managed, sludge loadings on the apparatus can be cycled up to three times in a 24 hour period, processing on the order of 10 pounds of conditioned dry basis sludge per square foot from about 3.5% to 15% solids concentration. The drying phase of deliquification on the drying surface can increase solids levels from 15% to about 60% within five days with only one manipulation in every 24 hour period. More frequent manipulations reduce the required retention period.

Now referring to the drawings, and first to FIG. 1, the apparatus generally comprises a planar, impervious slab 1, preferably of fiber-reinforced high strength concrete, accurately finished to produce a smooth top surface. Slab 1 serves as the foundation of the complete structure, cast over a graded base or other appropriate structure 2. The slab may be sloped and is at a higher elevation than its immediate surroundings having appropriate drainage ditches 3. Each ditch serves as a spillway and conduit to a collection basin connected at its lower end. Fixed vertical side walls 4 are mounted along both sides of the structure to define the width and length of the containment area. Vertical channels 5 are affixed to each end of the side walls to hold slide-in, dual-purpose gates that serve as end walls 8 to complete the enclosure and as ramps 8' when in the horizontal position covering drainage ditches 3.

Precast, uniform, rigid and porous support blocks 6, more completely shown in FIGS. 3 and 4, are made of uniformly sized hard particles bound together by a urethane resin. A support block 6 is shaped preferably to have an elongated length that has a wider top 16 than the dimension of bottom 17, also clearly illustrated in FIGS. 3 and 4. In the finished apparatus such blocks are laid end-to-end and side-to-side with the narrow bottom dimension of the blocks in contact with the foundation.

The bottom of the blocks are affixed to the foundation slab with a coating of mastic adhesive 15 (FIG. 3) which remains pliable on curing and accommodates differential expansion and contraction of the slab and the array of blocks. With the wider top dimension of a block in contact with adjacent blocks, a continuous void space is created along either side of the length dimensions forming a flume 10 with the foundation base, the center line of which is aligned with the slope of the base, if any (FIG. 4). When the block array is in place on the foundation base, the elongated length of the blocks and formed flumes 10 extend underneath apron 9 of layer 7 outside of containment walls 8. Blocks 6 are parallel to and separated from the fixed side walls 4 by an expansion strip of UV-resistant elastomer 14 affixed to the base of the side walls and to the contact edges of the blocks to accommodate differential expansion and contraction of the assembly. The ends of the block array are always accessible on the two ends of the overall structure for inspection and flushing, thereby assuring easy maintenance and functionality of both the drainage feature of the flumes 10 and the filtration capability of the overlying filter surface layer 7.

Layer 7 is a relatively thin layer of uniformly sized hard particles bound in an ultraviolet resistant cross-linking monomeric urethane resin. This layer forms the top surface of the structure. This surface layer is formed onto the array of support blocks 6 by conventional screeding and troweling techniques, similar to those used for preparing finished concrete, to form a smooth, rigid, porous and continuous drainage surface upon curing. Porosity of the surface is controlled by the size and shape of the uniformly sized, hard particles and the controlled weight-to-volume ratio of the particles to the ultraviolet light resistant resin monomer.

The apparatus as described above is inherently designed to withstand the weight and use of conventional mechanical equipment for removal of free-water-drained residual solids 12 from the surface of the drainage apparatus in a procedure know in the industry as "harvesting".

FIG. 1 illustrates the apparatus with a fixed side 4 and, respectively, end gate containment walls 8 and 8' in place (8) and, in the alternative, as an equipment access and egress ramp (8') over drainage ditches 3 at the two ends of the drainage apparatus. Also shown are drainage flumes 10 formed by the support blocks 6 and underlying impervious plane 1 which lead to drainage ditches 3 to receive clear filtrate flowing down and through the drainage surface and support blocks.

The hard surface evaporative drying area 11 is preferably located adjacent to or as nearby as practical to the drainage apparatus just described in order to minimize transport. The drying area with an appropriate retention curb 13 can be constructed in a manner similar to that used for the foundation base structure as described above, and dimensioned in accordance with the retention time necessary for drying to the extent required and the sludge volume processed per day through the apparatus.

The drainage flumes between the array of blocks and the underlying foundation base are open and accessible at both ends of the array for the purpose of usual maintenance to assure optimum filtration and drainage capacity of the apparatus. Should evidence of plugging or blockage of the filter surface become evident, either localized or in general, simple pressurized water purging on the surface or, on an individual flume basis, with an intensive high pressure backwash treatment can easily be accomplished to return the filtration rate to its original capacity.

Maintenance in the simplest form, normally adequate for continuing operations, is accomplished by surface washing. Individual flume flushing is accomplished by inserting a nozzle into one end of the flume and jetting water to flush the flume. If the interstitial spaces of the drainage surface remain fouled following these simple wash-down procedures, an intensive localized high pressure backwash procedure can be utilized to restore porosity.

Thus, a relatively thin layered structure with an accessible surface layer is achieved that can be maintained quite easily. Exposed drainage channels outside the limits of the necessary containment walls are provided on both ends. These channels or flumes provide a means for visual inspection and are utilizable for maintenance purposes, as described above.

The urethane resin as a matrix binder that is impervious to the effects of degradation by sunlight makes rendering reapplications on the bed surface unnecessary.

The use of "high strength" concrete for the purpose of making a thin layer in this application is unknown in the prior art. High strength concrete comprises polymeric additives and preferably also reinforcing fibers distributed throughout the mass. The additives allow a greatly reduced water involvement and render rebar reinforcement unnecessary. Full strength is achieved in a fraction of the time required for common concrete. The porosity that is achievable approaches zero. Labor savings are believed to be as great as 90% and the overall material savings are also great.

Although in other context expansion joints are known, they have previously been unknown in a sludge deliquification surface. The Highstreet et al. patent referred to above requires a sealing material between modules, which is a different concept altogether.

All previously known apparatus of the general type provided for dewatering by natural drainage methods is accomplished also herein. However, the present structure allows further dewatering, as hereafter discussed. It is known that 15% solids can be achieved rather rapidly by drainage alone, this 15% being approximately a limit for drainage only. In the prior art, further dewatering is accomplished by evaporation and evaporation acceleration methods. The use of the above described apparatus anticipates that the sludge solids are removed from the drainage surface as soon as free drainage ceases and that this sludge is moved to an impervious evaporation surface adjacent the drainage bed where regular manipulation of the solids results in accelerated evaporation. By stirring the solids around or simply moving them, fresh moist surfaces are exposed and evaporated to enable the reaching of 60% solids in a fraction of the time otherwise required.

With respect to the flowability of the structure described herein with respect to those structures of the prior art previously identified, fluid flow principles involving small orifice dynamics explain the success of the instant structure with respect to those prior. Stated simply, flowing water follows the path of least resistance. The smaller the orifice through which the water flows, the greater will be the pressure requirement for an equal amount of water to flow. Small orifices, plugged by degree with imbedded sludge solids will resist flow exponentially for a given hydraulic head pressure. Backwash procedures utilizing only a common hydrostatic head of pressure will cause upward water flow only through orifices that are not plugged or only slightly reduced by some sludge, essentially bypassing plugged orifices. By contrast, the structure described herein provides an accessible substructure of improved fixed media that permits localized, high pressure, direct jet backwashing of the overlying porous surface. Such procedure can further be combined with surface washing or surface suction techniques, if desired.

While a particular embodiment of the invention has been shown and described, it will be understood that the invention is not limited thereto since modifications can be made and will become apparent to those skilled in the art.

What is claimed is:

1. An improved filtration, drainage and drying apparatus for deliquifying sludges comprising a rigid, thin, porous, monolithic, continuous top layer of small, hard, uniform particles of material of of narrow size distribution bonded together by a cross-linking monomeric resin resistant to ultraviolet light in such manner such that the interstices between the particles are not filled while liquid drainage is permitted through said top layer, a rigid, porous, lower layer comprising a side-by-side and end-to-end array of uniformly shaped support blocks of elongated length and narrow cross-section normal to the length, the cross-section of each of said blocks having a wider top dimension than its bottom dimension, said blocks being comprised of hard uniform particles of material of narrow size distribution no smaller than said particles of said top layer and bonded together in the identical manner of said top layer, said lower layer forming a plurality of open, parallel flumes formed by the dimensions of said blocks in said array, vertical containment walls located about said top layer comprising four sides, at least one of which serves as a removable gate wall for providing access to said top layer, and a rigid, planar, impervious base on which said array of top layer, lower layer and vertical containment walls are mounted.

2. Filtration, drainage and drying apparatus in accordance with claim 1, and including a hard, impervious planar surface placed adjacent said top layer onto which sludge solids harvested from said top layer are placed for further dewatering and drying by evaporation.

3. Filtration, drainage, and drying apparatus in accordance with claim 1, wherein said bonding material for each layer is ultraviolet light resistant urethane monomeric resin that polymerizes to a hard crosslinked solid.

4. Filtration, drainage, and drying apparatus in accordance with claim 1, wherein said base and containment walls are made of high strength concrete.

5. Filtration, drainage, and drying apparatus in accordance with claim 1, wherein said removable gate wall being convertable to an ingress and egress ramp to said to layer over an adjacent drainage ditch.

6. Filtration, drainage, and drying apparatus in accordance with claim 1, wherein said top and lower layers are each separated from said side walls by at least one strip of ultraviolet resistant material, as an expansion joint to accommodate diurnal seasonal expansion and contraction of said top and lower layers caused by temperature changes.

7. Filtration, drainage, and drying apparatus in accordance with claim 1, wherein said base is sloped at an angle between zero and 60 degrees from horizontal.

8. Filtration, drainage, and drying apparatus in accordance with claim 1, wherein said open flumes formed by said array of said support blocks are visibly and physically accessible for inspection and maintenance.

9. Filtration, drainage, and drying apparatus in accordance with claim 1, wherein said support blocks of said lower layer are affixed to said base with a pliable elastomeric adhesive material.

* * * * *